United States Patent
Mortzheim

(10) Patent No.: US 6,669,203 B1
(45) Date of Patent: Dec. 30, 2003

(54) BRUSH SEAL PLACEMENT BETWEEN ROTATING AND STATIONARY COMPONENTS WITH REVERSELY BENT LEAF SPRING

(75) Inventor: Jason Paul Mortzheim, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/192,844

(22) Filed: Jul. 11, 2002

(51) Int. Cl.[7] ................................................ F16J 15/44
(52) U.S. Cl. ...................... 277/355; 277/411; 277/412; 277/413
(58) Field of Search ................................ 277/355, 409, 277/411, 412, 413

(56) References Cited

U.S. PATENT DOCUMENTS

| | | | | |
|---|---|---|---|---|
| 4,103,905 A | * | 8/1978 | Desmond et al. | 277/413 |
| 5,474,305 A | * | 12/1995 | Flower | 277/355 |
| 5,503,405 A | * | 4/1996 | Jewett et al. | 277/413 |
| 5,509,780 A | * | 4/1996 | Synfelt | 415/174.1 |
| 6,022,027 A | * | 2/2000 | Chevrette et al. | 277/413 |
| 6,250,641 B1 | * | 6/2001 | Dinc et al. | 277/355 |
| 6,331,006 B1 | | 12/2001 | Baily et al. | |

* cited by examiner

Primary Examiner—Anthony Knight
Assistant Examiner—E Peavey
(74) Attorney, Agent, or Firm—Nixon & Vanderhye

(57) ABSTRACT

A plurality of arcuate brush seal segments are disposed in radially inwardly opening grooves of a stationary component, enabling tips of the brush bristles to engage the surface of a rotating component. A leaf spring is welded at one end to each brush seal segment and has first and second circumferentially extending curved portions. The first curved portion extends lengthwise of the spring from the welded end to engage the base of the groove at a location intermediate the length of the spring. The second curved portion engages the radial outer face of the segment adjacent the tip of the spring. All of the segments are thus biased for movement radially inwardly toward the rotating component, enabling pressure forces during operation to maintain the brush seal segments properly located to ensure the seal.

9 Claims, 3 Drawing Sheets

BRUSH SEAL PLACEMENT BETWEEN ROTATING AND STATIONARY COMPONENTS WITH REVERSELY BENT LEAF SPRING

BACKGROUND OF THE INVENTION

The present invention relates generally to brush seals and particularly relates to arcuate brush seal segments resiliently mounted between a rotating component and a component fixed against rotation.

Brush seals are commonly used to seal the gaps between a rotating component and a stationary component. For example, in turbomachinery, brush seals are commonly used to seal between a rotating shaft, i.e., a rotor, and a fixed housing or stationary component about the rotor.

Typically, the brush seals are provided in arcuate segments, generally corresponding to the circumference of the components to be sealed. Each segment includes mounting plates between which brush bristles are disposed. The bristles have free ends projecting radially beyond the edges of the mounting plates for engagement against, and forming a seal with, the rotating component. To maintain the bristles between the mounting plates, the arcuate radial outer face of the mounting plates and the bristles exposed at their ends in the space between the mounting plates are welded to one another.

In a typical installation, one of the mounting plates includes an axially extending flange or hook. The annular radially inwardly opening groove of the stationary component in which the brush seal segment is disposed also includes a slot opening axially into the groove. The groove and slot are sized such that the brush seal segment is movable axially in one direction under higher pressure forces on one side of the segment than on the opposite side, i.e., higher pressure on the upstream side than on the downstream side, to maintain the downstream mounting plate against an end wall of the groove. The annular space between the outer face of the brush seal segment and the base of the arcuate groove, in operation of the turbomachinery, presumably has a pressure equal to the upstream pressure. This pressure maintains the arcuate seal segment biased in a radial inward direction to engage the inner surface of the hook against the outer surface of the flange of the stationary component. These pressure forces work well when the seal is assembled in the upper half of the stationary component of a turbine where gravity acts in a downward direction. This affords a natural engagement of those surfaces with one another and a radially inward positioning of the brush seal segment relative to the stationary component groove.

However, for brush seal segments in the lower half of the turbine casing, it will be appreciated that the radially inwardly facing surfaces of the segment hooks are spaced from the radially outwardly facing surface of the stationary component flange since the gravitational forces locate the brush seal segments in their radially outermost position. At turbine startup, the higher pressure biases the brush seal segments in a downstream axial direction. However, because there is no gap between the brush seal segments and the base of the groove, the brush seal segments are not displaced radially inwardly to engage the bristles against the rotor, thus leaving significant leakage gaps between the stationary and rotating components rendering the brush seal is ineffective.

Efforts to alleviate this problem have included the use of set screws through packing rings to align the seal with the appropriate mating surfaces upon assembly of the seal into the turbomachinery. Another effort to alleviate the problem is described and illustrated in U.S. Pat. No. 6,331,006, of common assignee herewith. These methods, however, are not applicable to all brush seal installations. In addition, the leaf spring disclosed in U.S. Pat. No. 6,331,006 cannot be readily installed at great distances from the ends of the diaphragm halves of the turbomachinery. Insertion of the brush seal segments and leaf springs disclosed in that patent at locations remote from the insertion entry location is difficult.

BRIEF DESCRIPTION OF THE INVENTION

In accordance with a preferred embodiment of the present invention, there is provided a brush seal segment in combination with a leaf spring attached to the outer surface of the segment. One end of the leaf spring is secured, preferably by welding, adjacent an end of the brush seal segment. The leaf spring includes a pair of reversely curved portions, i.e., first and second curved portions, for contact with the stationary component and brush seal segment, respectively. The first curved section extends from the end secured to the segment radially outwardly until at a location intermediate opposite ends of the leaf spring, the spring engages the base of the groove of the stationary component. The second curved portion engages the outer face of the brush seal segment and has an upturned end. The second curved portion enables the spring to flatten out and return by way of the relative movement of the second curved portion along the outer face of the brush seal segment as the spring is loaded and unloaded.

Because the brush seal segment and spring are secured to one another, e.g., by welding, they constitute essentially a unitary integral part having the capability of sliding in a circumferential direction in the groove of the stationary component to an appropriate location for the brush seal segment. Positive engagement between the curved portions of the spring and the stationary and rotating components upon insertion is maintained because of the natural curvature of the leaf spring. Also, absent a positive force causing the seal to slide along the circumferential groove, the seal will remain fixed, serving as an anti-rotation feature for assembly and during operation.

In a preferred embodiment of the present invention there is provided a brush seal and spring combination for disposition between a first rotatable component and a second component fixed against rotation, comprising an arcuate brush seal segment for disposition between the first component and the second component and including a pair of arcuate plates and a plurality of brush bristles projecting therefrom having free ends for sealing with the first rotatable component, and an elongated leaf spring for disposition between the brush seal segment and the second component, the leaf spring being secured adjacent one end to the brush seal segment and having first and second circumferentially extending reversely curved portions, the first curved portion projecting away from the brush seal segment for engaging the second component at a location along the spring intermediate opposite ends thereof, the second curved portion being located adjacent a second end of the spring opposite the one end and in engagement with the brush seal segment.

In a further preferred embodiment of the present invention there is provided a brush seal assembly, comprising a first rotatable component having an axis of rotation; a second component fixed against rotation about the axis and radially outwardly of the rotatable component, the fixed component having a radially inwardly opening groove and an axially opening slot in communication with the groove; an arcuate brush seal between the rotatable component and the fixed component in the groove and including an axially projecting hook for reception in the slot, the brush seal having a support mounting a plurality of bristles projecting therefrom and having free ends in sealing relation with the rotary component, the support having an arcuate radial outer surface, a leaf spring between the fixed component and the outer face for biasing the brush seal for movement in a generally radially inward direction, the leaf segment being secured adjacent one end to the brush seal adjacent one end of the spring and having first and second reversely curved portions, the first curved portion projecting away from the brush seal for engaging the second component at a location along the spring intermediate opposite ends thereof, the second curved portion being located adjacent a second end of the spring opposite the one end and in engagement with the brush seal outer face.

DETAILED DESCRIPTION OF THE INVENTION

Figure 1:
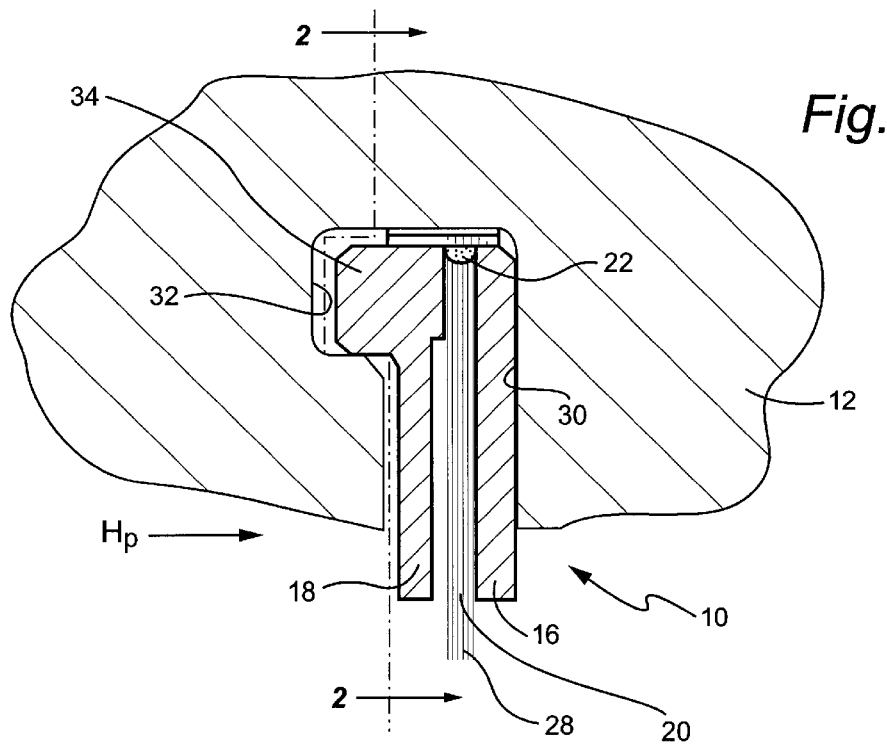
FIG. 1 is a fragmentary cross-sectional view through a brush seal segment in an arcuate groove of a stationary component in turbomachinery and having a leaf spring for locating the segment in accordance with a preferred embodiment of the present invention.
Figure 2:
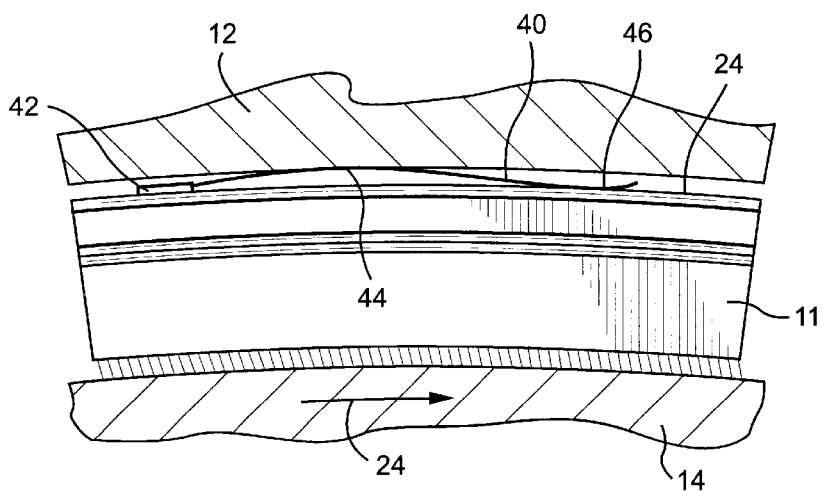
FIG. 2 is a cross-sectional view thereof taken generally about on line 2—2 in FIG. 1.
Figure 3:
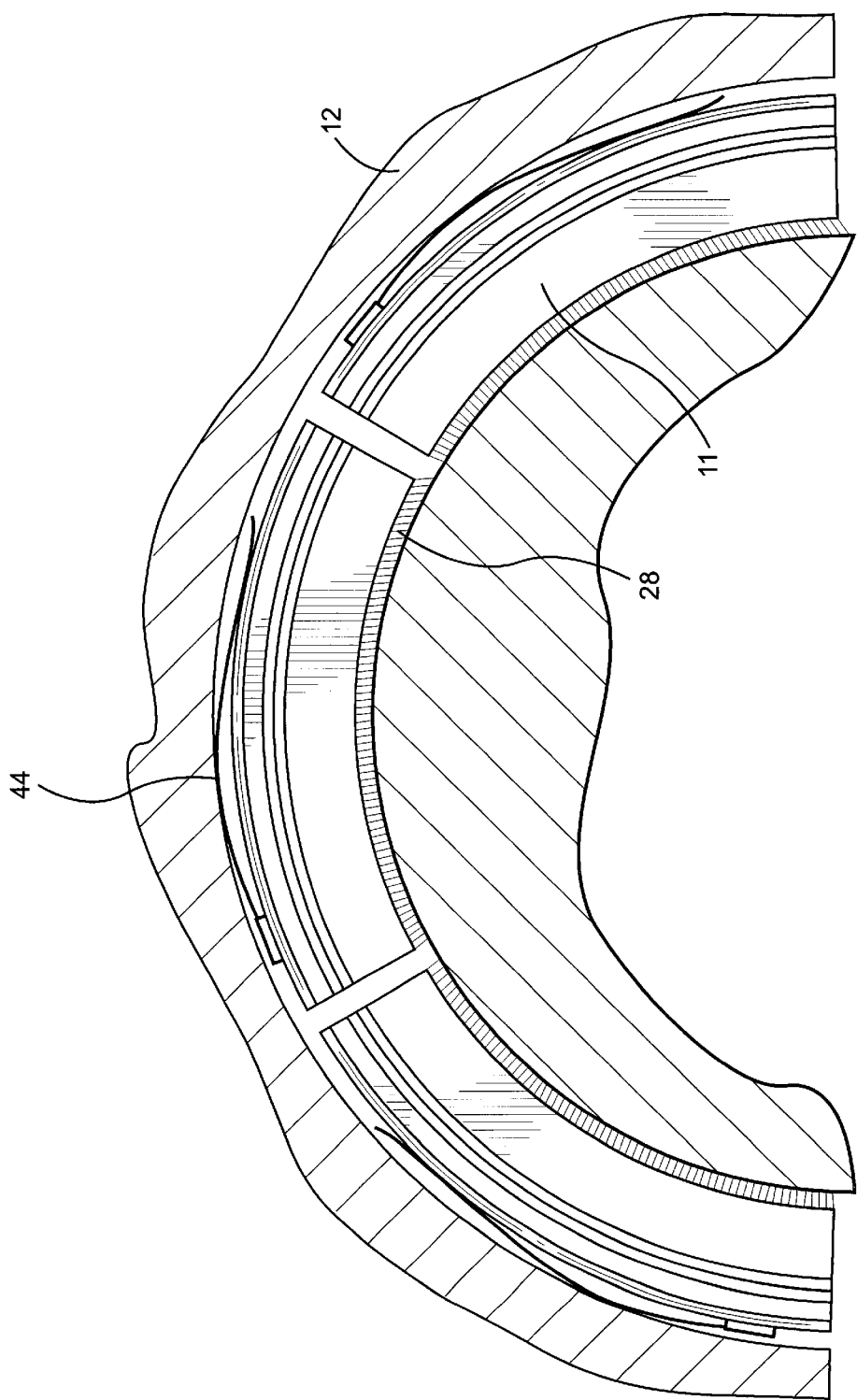
FIG. 3 is a fragmentary cross-sectional view illustrating a plurality of brush seal segments in the groove of a stationary component.
Figure 4:
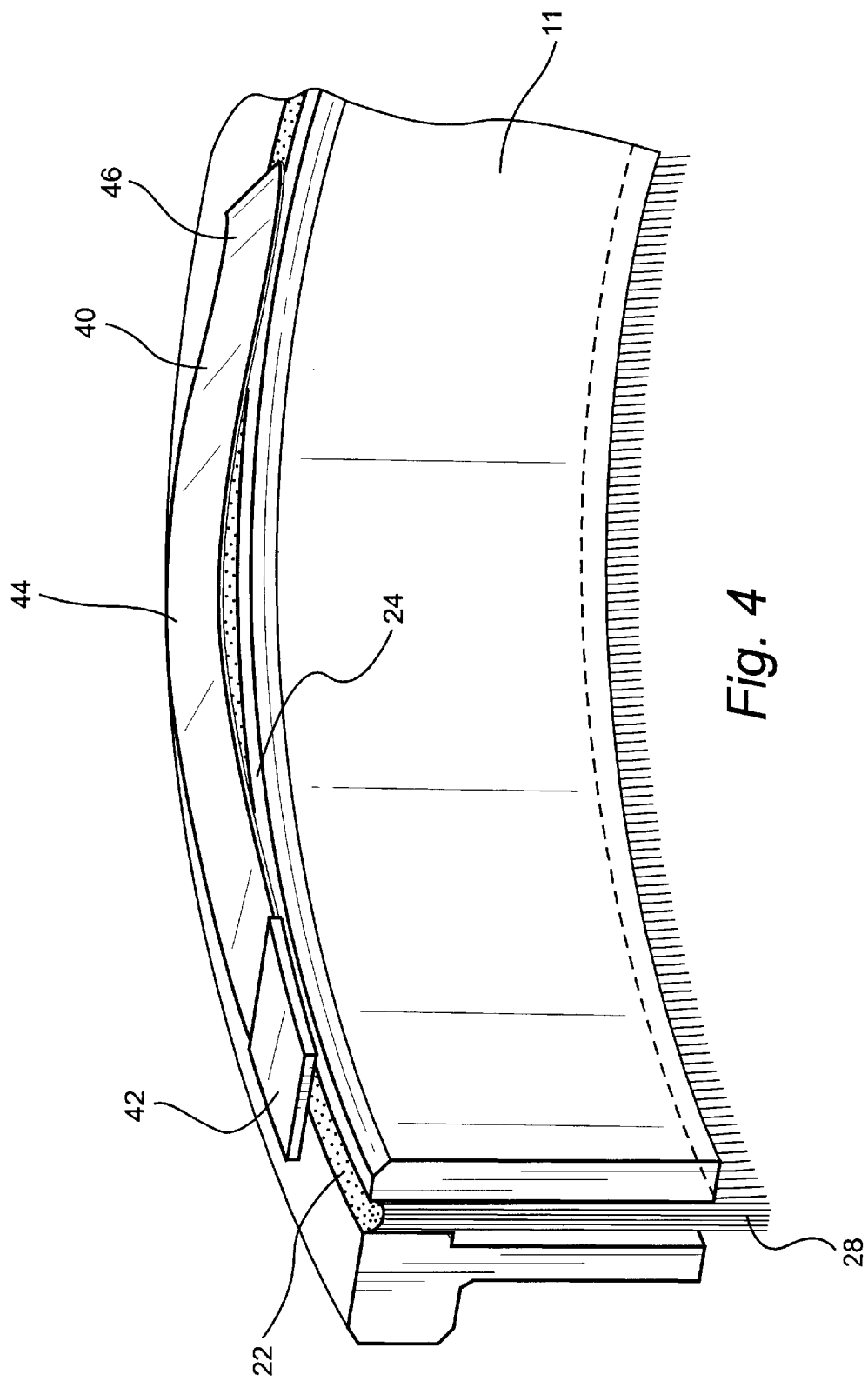
FIG. 4 is a perspective view of a brush seal segment with leaf spring.

Referring now to the drawings, particularly to FIG. 1, there is illustrated a brush seal, generally designated 10, for sealing between a stationary component 12 and a rotatable component, for example, a rotor, 14 (FIG. 2). The brush seal 10 includes a plurality of arcuate brush seal segments 11 each including a support comprised of a pair of backing plates 16 and 18. Plates 16 and 18 mount a plurality of brush bristles 20 therebetween. The radially outer ends of the bristles and the backing plates 16 and 18 are secured to one another, preferably by a weld bead 22 formed along the outer radial surface 24 of the segment 11. The bristles extend in a circumferential plane from the outer surface, i.e., the weld bead 22, at an angle offset from the radius to the axis of rotation of the rotor 14. Thus, the bristles are canted, typically in the direction of rotation of the rotor 14 indicated by the arrow 24 in FIG. 2. The bristles 20 extend generally radially inwardly and terminate in free ends or tips 28 for engagement against the surface of the rotating component. The bristles 20 may be formed of metal but may also be formed of other materials, such as ceramics.

The brush seal segment is mounted in the arcuate groove 30 of the stationary component 12. The groove opens radially inwardly for 360° about the axis of rotation. A slot 32 opens axially into the groove 30 at a radial location adjacent the base of the groove 30. The cross-sectional configuration of the brush seal segment 11 is generally complementary to the cross-sectional shape of the groove 30, including slot 32, but at a reduced dimension. Particularly, the backing plate 18 on the high pressure side, indicated $H_p$ and the accompanying arrow indicating flow direction has a hook or a flange 34 which extends axially in an upstream direction into the slot 32. With this configuration, radial and axial clearances are provided between the segment 11 and the surfaces forming the slot 30.

A spring 40 is disposed between the arcuate segment 10 and the base of groove 30 in the clearance space therebetween. Spring 40 comprises an elongated leaf spring which is secured at one end along the radial outer surface of the brush seal segment 11. For example, this securement may comprise a weld 42 between the spring 40 and the radial outer surface of segment 11. The spring 40 has first and second reversely curved portions 44 and 46, respectively, as it extends along the clearance slot. The first curved section 44 projects from the welded end thereof into engagement with the base of the groove 30 at a location substantially intermediate the length of the spring. The second curved portion 46 lies adjacent the end of the spring opposite its welded end and engages against the radial outer surface of the segment 11. With this configuration, it will be appreciated that the spring 40 biases the seal segment 11 in a radial inward direction, with the force being distributed between the opposite spring ends directly onto the segment. Note also that as the segment moves in a radial direction, the spring may compress or expand in the clearance gap between the segment and the base of the groove with the curved portion 46 sliding along the outer face of the segment.

It will appreciated that with the spring secured to the seal segment, for example, by welding, the segments 11 can be inserted into the groove 30 of the stationary component and maintained by the spring in a selected circumferential position about the groove. Preferably, these segments are inserted into the groove with the welded end inserted first. Thus, the spring can naturally expand or contract as necessary in the clearance gap between the stationary component and segment as the segment is displaced circumferentially in the groove into position. The spring thus provides an anti-rotation feature when located in the appropriate circumferential position. Further, when the segments are inserted into the groove along the lower half of the stationary component, the spring naturally biases the segment into and toward its radially innermost position. This permits at startup high pressure flow to bias the segments in an axial downstream direction and also permits the high pressure flow to enter into the clearance space between the base of the groove and the radial outer face of the segment to bias the segment radially inwardly to ensure proper sealing engagement of the brush seal bristle tips 28 along the rotor surface.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A brush seal and spring combination for disposition between a first rotatable component and a second component fixed against rotation, comprising:

an arcuate brush seal segment for disposition between the first component and the second component and including a pair of arcuate plates and a plurality of brush bristles projecting therefrom having free ends for sealing with the first rotatable component; and an elongated leaf spring for disposition between the brush seal segment and the second component;

said leaf spring being fixedly secured adjacent one end to the brush seal segment and having first and second circumferentially extending reversely curved portions, said first curved portion projecting away from said brush seal segment for engaging the second component at a location along said spring substantially medially of opposite ends thereof, said second curved portion being located adjacent a second end of said spring opposite said one end and in engagement with the brush seal segment.

2. A brush seal and spring combination for disposition between a first rotatable component and a second component fixed against rotation, comprising:

an arcuate brush seal segment for disposition between the first component and the second component and including a pair of arcuate plates and a plurality of brush bristles projecting therefrom having free ends for sealing with the first rotatable component; and an elongated leaf spring for disposition between the brush seal segment and the second component;

said leaf spring being secured adjacent one end to the brush seal segment and having first and second circumferentially extending reversely curved portions, said first curved portion projecting away from said brush seal segment for engaging the second component at a location along said spring intermediate opposite ends thereof, said second curved portion being located adjacent a second end of said spring opposite said one end and in engagement with the brush seal segment;

said leaf spring being welded to said brush seal segment at said one end thereof.

3. A combination according to claim 1 wherein the spring extends over the majority of the length of the segment.

4. A combination according to claim 2 wherein said second end of said spring is slidable along said brush seal segment.

5. A brush seal assembly, comprising:

a first rotatable component having an axis of rotation;

a second component fixed against rotation about said axis and radially outwardly of said rotatable component, said fixed component having a radially inwardly opening groove and an axially opening slot in communication with said groove;

an arcuate brush seal between said rotatable component and said fixed component in said groove and including an axially projecting hook for reception in said slot, said brush seal having a support mounting a plurality of bristles projecting therefrom and having free ends in sealing relation with said rotary component;

said support having an arcuate radial outer surface;

a leaf spring between said fixed component and said outer face for biasing said brush seal for movement in a generally radially inward direction, said leaf spring being fixedly secured adjacent one end to the brush seal adjacent one end of the segment and having first and second circumferentially extending reversely curved portions, said first curved portion projecting away from said brush seal for engaging the second component at a location along said spring intormodiato substantially medially of opposite ends thereof, said second curved portion being located adjacent a second end of said spring opposite said one end and in engagement with the brush seal outer face.

6. An assembly according to claim 5 wherein said second end of said spring is slidable along said brush seal segment.

7. An assembly according to claim 5 wherein said leaf spring is welded to said brush seal segment at said one end thereof and said second end of said spring is slidable along said brush seal segment.

8. An A brush seal assembly, comprising:

a first rotatable component having an axis of rotation;

a second component fixed against rotation about said axis and radially outwardly of said rotatable component, said fixed component having a radially inwardly opening groove and an axially opening slot in communication with said groove;

an arcuate brush seal between said rotatable component and said fixed component in said groove and including an axially projecting hook for reception in said slot, said brush seal having a support mounting a plurality of bristles projecting therefrom and having free ends in sealing relation with said rotary component;

said support having an arcuate radial outer surface;

a leaf spring between said fixed component and said outer face for biasing said brush seal for movement in a generally radially inward direction, said leaf spring being secured adjacent one end to the brush seal adjacent one end of the segment and having first and second circumferentially extending reversely curved portions, said first curved portion projecting away from said brush seal for engaging the second component at a location alone said spring intermediate opposite ends thereof, said second curved portion being located adjacent a second end of said spring opposite said one end and in engagement with the brush seal outer face;

said support including a pair of plates, said bristles being secured to and between said plates by a circumferentially extending weld.

9. A brush seal assembly, comprising:

a first rotatable component having an axis of rotation;

a second component fixed against rotation about said axis and radially outwardly of said rotatable component, said fixed component having a radially inwardly opening groove and an axially opening slot in communication with said groove;

an arcuate brush seal between said rotatable component and said fixed component in said groove and including an axially projecting hook for reception in said slot, said brush seal having a support mounting a plurality of bristles projecting therefrom and having free ends in sealing relation with said rotary component;

said support having an arcuate radial outer surface;

a leaf spring between said fixed component and said outer face for biasing said brush seal for movement in a generally radially inward direction, said leaf spring being secured adjacent one end to the brush seal adjacent one end of the segment and having first and second circumferentially extending reversely curved portions, said first curved portion protecting away from said brush seal for engaging the second component at a location along said spring intermediate opposite ends thereof, said second curved portion being located adjacent a second end of said spring opposite said one end and in engagement with the brush seal outer face;

said leaf spring being welded to said brush seal at said one end thereof.

* * * * *

UNITED STATES PATENT AND TRADEMARK OFFICE
CERTIFICATE OF CORRECTION

PATENT NO. : 6,669,203 B1
DATED : December 30, 2003
INVENTOR(S) : Mortzheim

It is certified that error appears in the above-identified patent and that said Letters Patent is hereby corrected as shown below:

<u>Column 5,</u>
Line 59, delete "intormodiato" after "said spring".

<u>Column 6,</u>
Line 5, delete "An" between "8." and "A".
Line 28, delete "alone" and insert -- along --.
Line 56, delete "protecting" and insert -- projecting --.

Signed and Sealed this

Sixteenth Day of March, 2004

JON W. DUDAS
*Acting Director of the United States Patent and Trademark Office*